US007155705B1

(12) United States Patent
Hershberg et al.

(10) Patent No.: US 7,155,705 B1
(45) Date of Patent: Dec. 26, 2006

(54) TECHNIQUES FOR BINDING AN APPLICATION WITH A DATA EXCHANGE FORMAT BASED ON TAGS IN COMMENTS

(75) Inventors: Yehoshua Hershberg, Kochav HaShachar (IL); Yishay Mor, Zichron Ya'akov (IL)

(73) Assignee: Cisco Technology, Inc., San Jose, CA (US)

( * ) Notice: Subject to any disclaimer, the term of this patent is extended or adjusted under 35 U.S.C. 154(b) by 496 days.

(21) Appl. No.: 09/994,525

(22) Filed: Nov. 26, 2001

(51) Int. Cl.
G06F 9/45 (2006.01)

(52) U.S. Cl. ....................................... 717/137

(58) Field of Classification Search ......... 717/106–109
See application file for complete search history.

(56) References Cited

U.S. PATENT DOCUMENTS

| 5,953,526 | A  | * | 9/1999  | Day et al. ................. 717/108 |
| 6,480,865 | B1 | * | 11/2002 | Lee et al. ................. 715/523 |
| 6,574,655 | B1 | * | 6/2003  | Libert et al. .............. 709/200 |
| 6,594,823 | B1 | * | 7/2003  | Corbin et al. ............. 717/143 |
| 6,675,370 | B1 | * | 1/2004  | Sundaresan ............... 717/106 |
| 6,754,884 | B1 | * | 6/2004  | Lucas et al. .............. 717/108 |
| 6,810,429 | B1 | * | 10/2004 | Walsh et al. .............. 709/246 |
| 2001/0054172 | A1 | * | 12/2001 | Tuatini ...................... 717/1 |
| 2002/0029231 | A1 |  | 3/2002  | Aptus et al. |

OTHER PUBLICATIONS

Flanagan, David, "Java in a Nutshell", 1997, O'Reilly & Associates, 2nd Edition, pp. 20, 233, 253-254.*
Goldfarb et al., "The XML Handbook", 1998, Prentice Hall Inc., p. 13.*

Dietrich et al., "A Reusable Graphical User Interface for Manipulating Object-Oriented Databases using Java and XML", Feb. 1, 2001, ACM, pp. 362-366.*
T. Moyle, "Writing XML-Friendly Java Documentation", Jan. 1, 2000.*
The Apache Software Foundation, "Javadoc Documentation in XML", 1999.*
A. Coates, "Making Your Code Readable and Maintainable—With XML & XSLT", XML DevCon Europe 2001, Feb. 2001.*
M. Priestley, "Dynamically assembled documentation", 1999, ACM.*
D. Kramer, "API Documentation from Source Code Comments: A Case Study of Javadoc", 1999, ACM.*
D. Leslie, "Using Javadoc and XML to Produce API Reference Documentation", Oct. 2002, ACM.*

(Continued)

*Primary Examiner*—Kakali Chaki
*Assistant Examiner*—Trenton Roche
(74) *Attorney, Agent, or Firm*—Hickman Palermo Truong & Becker, LLP

(57) ABSTRACT

Techniques for binding a data exchange format with a computer program application having source code in a particular language include receiving comment data from a particular file that includes the source code. The comment data includes first data indicating a parameter of the data exchange format. Second data from the particular file is also received. The second data is associated with the comment data and includes a statement that defines a class of data objects in the particular language. Based on the first data and the second data, third data for configuring the data exchange format is generated. When the particular language is Java and the data exchange format is XML, these techniques allow a developer to automatically produce an XML grammar document that is based on Java data objects defined by the developer and that is responsive to the developer's choices for options in the XML grammar. Individual classes or multiple nested classes are handled.

22 Claims, 6 Drawing Sheets

OTHER PUBLICATIONS

Anonymous, "XDoclet", http://xdoclet.sourceforge.net/introduction.html, pp. 1-2, printed Feb. 15, 2002.
Anonymous, "Software Configuration", http://xdoclet.sourceforge.net/using.html, pp. 1-4, printed Feb. 15, 2002.
Anonymous, "Xdoclet FAQ Home Page", http://www.jguru.com/faq/Xdoclet, pp. 1-3, printed Feb. 15, 2002.
Anonymous, "<ejbdoclet/≦ Task", http://xdoclet.sourceforge.net/ejbdoclet.html, pp. 1-26, printed Feb. 15, 2002.
Anonymous, "<webdoclet/≦ Task", http://xdoclet.sourceforge.net/webdoclet.html, pp. 1-15, printed Feb. 15, 2002.
Anonymous, "Advance Feature-Merge Points", http://xdoclet.sourceforge.net/merge.html, pp. 1-2, printed Feb. 15, 2002.
Anonymous, "IDE Integration", http://xdoclet.sourceforge.net/IDE.index.html, 1 page, printed Feb. 15, 2002.
Anonymous,"Architecture", http://xdoclet.sourceforge.net/architecture.html, pp. 1-12, printed Feb. 15, 2002.
Sun Microsystems, javadoc—The Java API Documentation Generator [online], Aug. 2000 [retrieved on Apr. 14, 2005] Retrieved from the internet: URL<http://java.sun.com/j2se/1.3/docs/tooldocs/win32/javadoc.html>.
Jeremy Roschelle, Doclet your servlet, Mar. 2001, JavaWorld.com.
Anonymous, "An Introduction to the UNIX Make Utility," Middle Tennesee State University, printed Jan. 10, 2002, 8 pages.
D. Morse et al., "UNIX man pages: make 0," Aug. 22, 1989, 4 pages.
Apache Software Foundation, "The Jakarta Site—Ant," 2000, 12 pages.
Sun Microsystems, "Javadoc Tool Home Page," printed Jan. 10, 2002, 4 pages.
Sun Microsystems, "How to Write Doc Comments for the Javadoc Tool," printed Jan. 10, 2002, 23 pages.
Sun Microsystems, "The Java Language Specification," Chap. 18—"Documentation Comments," $1^{st}$ ed. 1996, 21 pages.
Cymerman, Michael, "Automate your build process using Java and Ant," Javaworld, Oct. 2000, located on the internet at <http://www.javaworld.com/javaworld/jw-10-2000/jw-1020-ant_p.html>, retrieved on Oct. 6, 2005, 10 pages.
Henry, Kevin, "Using the Java Document Generator," ACM, Inc., Aug. 2000, located on the internet at <http://secure.acm.org/crossroads/columns/ovp/august2000.html>, retrieved on Oct. 5, 2005, 7 pages.
Roschelle, Jeremy, "Doclet your servlet!," Javaworld, Mar. 2001, located on the internet at <http://www.javaworld.com/javaworld/jw-03-2001/jw-0302-doclets_p.html>, retrieved on Oct. 5, 2005, 13 pages.

* cited by examiner

TECHNIQUES FOR BINDING AN APPLICATION WITH A DATA EXCHANGE FORMAT BASED ON TAGS IN COMMENTS

CROSS-REFERENCE TO RELATED APPLICATIONS

This application is related to prior U.S. application Ser. No. 09/978,966, filed on Oct. 15, 2001, by inventors Yishay Mor and Gadi Berman, entitled "Techniques For Generating Software Application Build Scripts Based On Tags In Comments."

FIELD OF INVENTION

The present invention generally relates to exchanging data with an application. The invention relates more specifically to techniques for binding a data exchange format, such as XML, to an application based on tags in comments of source code for the application.

BACKGROUND OF THE INVENTION

Data exchange between independently developed applications running on different families of processors is often accomplished with a published (open) markup language. For example, the HyperText Markup Language (HTML) is used for exchanging data over the Internet between resources of the world wide web. HTML is one example of a markup language derived from Standard Generalized Markup Language (SGML). Another language derived from SGML that is more powerful and flexible than HTML has been defined and has gained popularity for providing information across networks. The new standard, developed and promoted by the World Wide Web Consortium (W3C), is called the Extensible Markup Language (XML). XML provides a common syntax for expressing structure in data. Structured data refers to data that is tagged for its content, meaning, or use. XML provides an expansion of the tagging that is done in HTML. Whereas HTML focuses on format or presentation, XML focuses on content or use.

The elements of an XML document are defined in an XML grammar that is defined in a document type definition (DTD) document or XML schema. An XML grammar is a set of syntax rules for elements in SMGL and XML documents. The grammar defines what elements can be used in a document, what order they should appear in, if any, which elements can appear inside other elements, which elements have attributes, and what those attributes are. A grammar can be part of an XML document, or can be a separate document or series of documents in one or more files. XML allows documents to contain elements from several distinct DTD documents or schemas by the use of namespaces.

Data exchange also occurs between independently developed applications running on different families of processors and a database server. Such data exchange is often accomplished with a published (open) database query language. For example, the Structured Query Language (SQL) is used for exchanging data with database servers of several database systems. As used herein, a data exchange format includes either a markup language or a database query language or both.

Software applications execute on computing devices to perform a variety of functions related to processing and presenting information to users. Software applications often read, process and write information in the form of data objects. An object is a data structure that includes values for one or more attributes and may have one or more methods that provide behavior associated with those attributes. For example, when invoked, one method of a particular data object returns a current value of one of its attributes. A data structure that lists the attributes and methods of one or more similar objects is called the type or class of the objects. Each individual object, with specific values for the attributes, is an instance of the type or class. One object may have another object as an attribute. A programming language variable is a simple class of data objects, which support only one instance at a time; at different times the variable can contain different values, each considered a different instance of that variable class.

An application is typically developed as one or more source code modules, each written in a high-level programming language designed to facilitate human understanding of the steps involved in each module. Example high-level programming languages include FORTRAN, Visual Basic, C, C++, and JAVA®. Statements in such languages are combined to write each module. One or more source code modules are stored together in a source code file. The statements are converted to instructions for a processor on a computing device, which instructions are sometimes called machine instructions, by a particular process, such as a compiler. A compiler generates machine instructions based on several statements or an entire module. The machine instructions are peculiar to particular families of processors.

Currently, when a developer writes source code for an application, data structures such as data objects are defined and manipulated internally. If some data is to be imported to one or more of these data structures from other independently-developed applications, or exported from one or more of these data structures to other independently-developed applications, or both, then it is common to convert data between the data structures used internally and an exchange format, such as a markup language like XML, used for exchanging data. Converting data from an internal data structure to an exchange format is called marshalling the data to the exchange format. Converting data from an exchange format to the internal structure is called de-marshalling the data from the exchange format.

In past approaches, a developer is required to write and maintain data models redundantly. The developer implements the data model in program source code using data structures defined by the programming language, such as JAVA classes, and also separately implements the data model in some exchange format, such as an XML DTD document or schema. In addition, the developer is forced to write extra source code modules to marshal and de-marshal data with the exchange format.

The popularity of JAVA as a platform-independent programming language and the proliferation of XML for data representation has created a strong need for a convenient way of developing JAVA data objects that can easily be marshaled to XML and de-marshaled from XML. The marshaling and de-marshaling of JAVA data objects to XML is termed "XML/JAVA Data Binding" in this document.

One conventional approach to XML/JAVA Data Binding examines an XML DTD document and generates JAVA code defining object classes based on the XML DTD, and also generates methods for the classes that marshal and de-marshal data between an XML document and data objects of the classes. Example products that employ this approach include JAVA Architecture for XML Binding (JAXB) from Sun Microsystems, Inc., XML Studio from Breeze Factor LLC, and "Zeus" from Enhydra.org of Lutris Technologies, Inc. The product from Sun Microsystems is based not only on the XML DTD but also a second XML document that describes an association between XML elements/attributes and JAVA classes/attributes.

Another conventional approach to XML/JAVA Data Binding examines an XML grammar, as defined in a schema or DTD, and generates JAVA code defining object classes based on the grammar and also generates methods for the classes that marshal and de-marshal data between an XML document and data objects of the classes. An XML Schema document is an XML document with a limited number of elements for defining the elements of other XML documents. An XML Schema is a more easily understood way to define the components of an XML document than is a DTD document.

Another conventional approach to XML/JAVA Data Binding examines, at execution time, JAVA classes that support introspection, automatically develops an XML Schema consistent with the data model of the JAVA classes, and automatically marshals and de-marshals data between objects of those classes and XML documents using the developed XML Schema. JAVA classes that support introspection, such as JavaBeans, include methods that provide a list of attributes and attribute types for the class. Example products that employ this approach include "Castor" from Exolab.org of Intalio, Inc. Castor provides for schema-less binding. A developer merely invokes the tool at runtime on a set of JAVA objects, without providing any mapping to XML. The marshaling and unmarshaling is done automatically, using a generic mapping. A similar approach is taken by the "Long Term JavaBeans™ Persistence" framework described in the document "beans.html" in the online Web folder java.sun.com/xml/.

While suitable for many purposes, the conventional approaches suffer some disadvantages. The approaches that base JAVA code on XML DTD force a developer to accept data objects defined by the data exchange format instead of the other way around. For the developer to determine the object classes, the developer must first compose the XML DTD, then run the tool to generate the JAVA classes, and then return to complete the programming in JAVA. This sequence interrupts program development and is inconvenient. Further, the class definitions and class hierarchy are defined prior to invocation and regardless of the binding mechanism. Binding tools that generate classes do not take the existing class structure into account. Tools such as Castor and JavaBean long-term persistence that generate the XML based on the class structure leave too little control on the XML schema or DTD in the hands of the developer. There is a need for a tool to bind a given schema to a given class structure. It would be preferable for the developer to develop the application in the programming language and deduce the exchange format from the classes defined for the application. Also, the approach is specific to JAVA and XML and does not work if the developer is using a different programming language or exchange format.

The approach that bases an XML DTD on the JAVA code is rule based and automatically organizes and names the XML elements and attributes without control of the developer. The rules may not be consistent with the developer's intentions for data exchange. For example, this approach does not allow a developer to distinguish whether one data object should be an XML attribute or an XML sub-element of another XML element. Also the developer may wish to associate two data items by giving them related names, like "salt" and "pepper;" the conventional approach automatically names the data items and denies the developer the opportunity to assign more meaningful names. Also the developer may wish to restrict the number of sub-elements contained in an XML element. The conventional approach does not permit the developer to impose such restrictions between XML elements. In addition, the developer may wish to exchange data in only a subset of the classes defined in the source code; however, the conventional tool automatically generates XML DTD statements for all the classes.

Furthermore, this approach executes more slowly. The XML schema is deduced at runtime, which takes extra processing time. Also, the extra logic to determine how to marshal and de-marshal, given the deduced XML schema, also takes additional time to execute. The slower execution of this approach can become a hindrance to performance, especially as the source code becomes larger and more complex.

Based on the foregoing, there is a clear need for techniques that automatically employ an open exchange format that is configured for data structures internal to the source code and that is responsive to developer choices for options in employing the open exchange format.

Furthermore there is a need for techniques that additionally can automatically generate instructions to marshal and de-marshal data between the open exchange format employed and the internal data structures.

In particular, there is a need for techniques that automatically produce an XML DTD document that is based on JAVA data objects defined by a developer and that is responsive to developer choices for options in the XML DTD.

SUMMARY OF THE INVENTION

The foregoing needs, and other needs and objects that will become apparent from the following description, are achieved in the present invention, which comprises, in one aspect, a method for binding a data exchange format with a computer program application having source code in a particular language. Comment data is received from a particular file that includes the source code. A source code processor of the particular language ignores comment data. The comment data includes first data indicating a parameter of the data exchange format. Second data from the particular file is also received. The second data is associated with the comment data and includes a statement that defines a class of data objects in the particular language. Based on the first data and the second data, third data for configuring the data exchange format is generated.

According to an embodiment of this aspect, the data exchange format is an extensible markup language (XML).

According to an embodiment of this aspect, the particular language is the JAVA language; and the first data includes a tag for an automated JAVA documentation system called JavaDoc.

According to another aspect of the invention, a method for binding a data exchange format with an application having source code in a particular language includes inserting first data into the source code within comment data. The first data includes a tag and a parameter of a data exchange format. The method includes causing a processor to produce second data for configuring the data exchange format based at least in part on the first data.

According to an embodiment of this aspect, the particular language is the JAVA language and the tag is a user-defined tag of an automated JAVA documentation system called JavaDoc. The step of causing a processor to produce the second data involves providing a routine called a doclet to produce the second data. JavaDoc automatically invokes the doclet in response to the tag. Multiple nested JAVA classes are also handled.

In other aspects, the invention encompasses an apparatus, a computer apparatus and a computer readable medium, including a carrier wave, configured to carry out the foregoing steps.

These techniques allow a developer to automatically produce an XML DTD document that is based on JAVA data objects defined by the developer and that is responsive to the developer's choices for options in the XML DTD.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
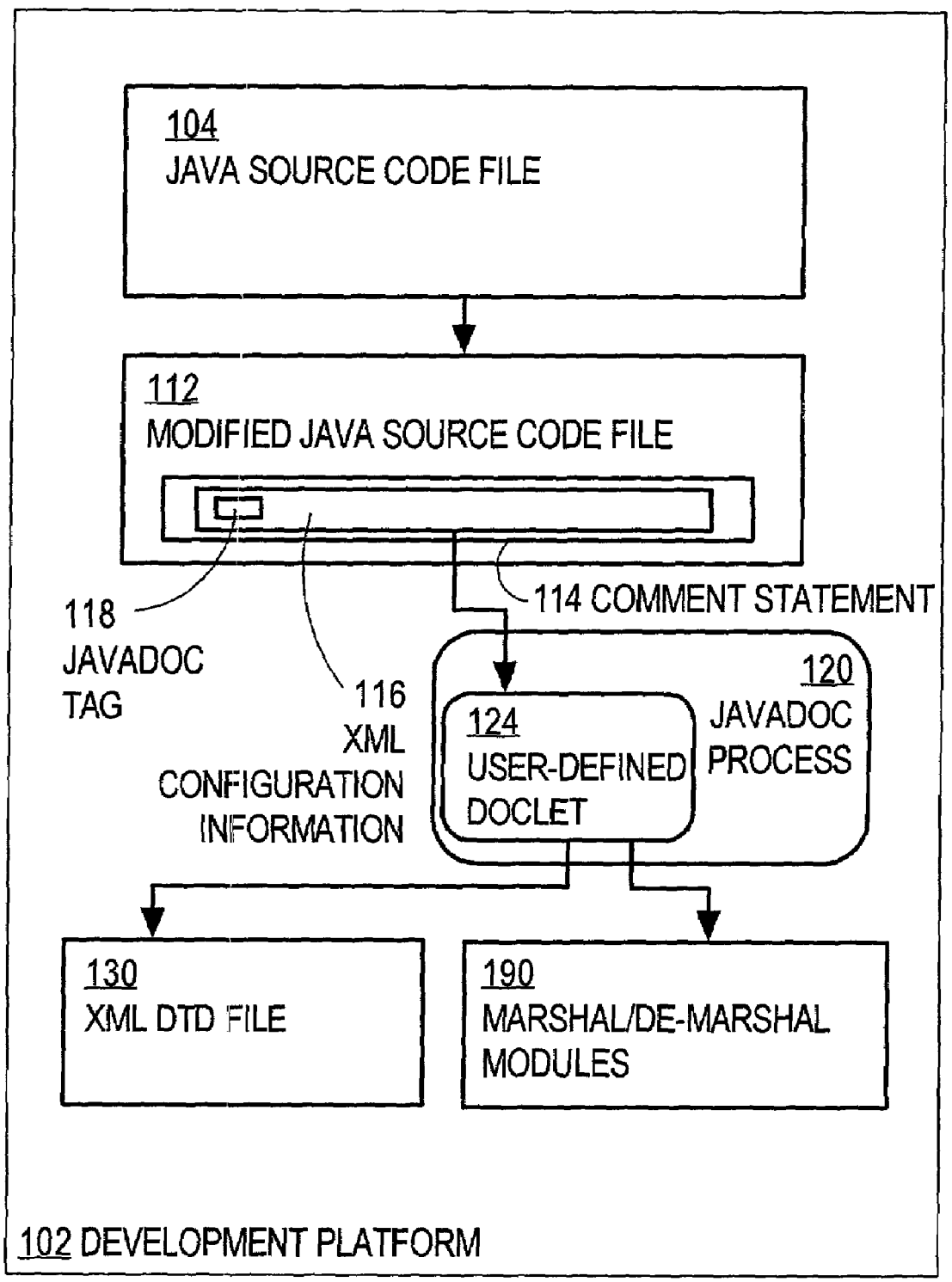
FIG. 1A is a block diagram that illustrates files and processes on a development platform that perform XML/JAVA Data Binding, according to an embodiment.

A method and apparatus for binding a computer program application with a markup language for data exchange is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

To illustrate an example of binding a computer program application ("application") with a markup language, assume that a JAVA source code module for the application includes a class to be bound with XML. The class describes employees, each employee an object of the class. Also assume that a JavaDoc tool, described below, is employed to perform the binding.

Although JAVA and XML are described herein for purposes of illustrating an example embodiment, the invention is not limited to this embodiment. In other embodiments, other classes are bound to XML. In yet other embodiments, data structures in source code in other languages may be bound to other open data exchange formats. For example, data structures can be bound to columns and tables in a database system for use in a query language data exchange. In some embodiments the JavaDoc tool is not employed. Instead of the JavaDoc tool, a parser is developed to search through the source code and find the binding information.

Source Code

Table 1 lists example JAVA source code statements from an example application. Assume the application determines whether to offer an employee an early retirement package; and that source code for the application is stored in a file called retire.java. JAVA code in an Employee.java file defines an Employee class for data objects that describe individual employees.

TABLE 1

Statements in an Example JAVA Source Code File

| Line Number | JAVA Statement |
|---|---|
| 1 | ... |
| 2 | /** |
| 3 | * This class represents employees of the company running the application |
| 4 | */ |
| 5 | public class Employee { |
| 6 | /** |
| 7 | * empname is the last name of the employee |
| 8 | */ |
| 9 | public String empname |
| 10 | /** |
| 11 | * empid is the identification number of the employee |
| 12 | */ |
| 13 | public int empid |
| 14 | ... |
| 15 | } |

The ellipses in lines 1 and 14 indicate other JAVA statements that are not relevant to the illustrated embodiment. A comment statement contains data that is ignored by the compilers for the programming language. For example, in JAVA, as in C and C++, a comment is delimited by the symbols "/*" and "*/", or by the symbol "//" and a newline character, and a documentation comment statement is delimited by the symbols "/**" and "*/". JAVA compilers and interpreters do not process such comments or documentation comments.

The comment statement in lines 2 though 4 indicates to a reader of the source code that a neighboring JAVA statement, which defines a class, is defining a class for employees of the company that is using the application. The JAVA statements from line 5 though the closing brackets on line 15 define the class. The class is named "Employee" and is public, that is, available to be used in other JAVA classes. The class includes attributes "empname" and "empid" defined in lines 9 and 13, respectively. Empname is a series of characters, as indicated by the type "String" in line 9, and is public. Empid is an integer number, as indicated by the type "int" in line 13, and is also public. The comment statement in lines 6 through 8 indicates that the neighboring attribute, empname, includes the last name of the employee when an object of the class is instantiated. The comment-statement in lines 10 through 12 tells a reader of the source code that the neighboring attribute, empid, includes an identification number of the employee when an object of the class is instantiated.

JavaDoc Tool

A JavaDoc process is a software tool that uses information in comments statements in source code to generate application programming interface (API) documentation in HTML format. Descriptions of the JavaDoc tool at the time of this writing can be viewed from file index.html on the javadoc subdirectory of the j2ee directory on the worldwide web (www) at domain java.sun.org.

The JavaDoc tool allows users to define JAVA classes, called doclets, with methods that are invoked when a tag registered with the JavaDoc tool is encountered in comments in the source code. JavaDoc includes doclets with methods that are invoked for initially registered tags. The JavaDoc tool identifies tags in comments by the symbol "@" followed by a keyword. In one embodiment, the keywords in tags initially registered with the JavaDoc tool include "Company," "author," "version," and "Copyright," among others. "Company" and "Copyright" are non-standard tags. The JavaDoc tool allows a user to register additional tags with other keywords and supply doclets to be invoked when the additional tags are encountered in comment statements.

Structural Overview

FIG. 1A is a block diagram that illustrates files and processes on a source code development platform 102 according to an embodiment. The structural elements of FIG. 1A are introduced in this section. A description of how the structures are used is given in more detail below with reference to FIG. 2 and FIG. 3.

The source code resides in source code file 104. For example, the JAVA statements listed in Table 1 are included in the source code file 104. The developer of the source code in file 104 knows information about the data structures that are relevant to binding with XML. For example, the developer knows that data in the class Employee will be exchanged with one or more other applications running on a network, but that data in other classes are generated and used internally and are not exchanged with other applications. For example, data in a class created for a projected retirement date and earnings is not going to be exchanged with other applications.

According to the illustrated embodiment, the developer generates a modified JAVA source code file 112 based on the JAVA source code file 104 by inserting into a comment statement 114, for each class of data objects to be exchanged with other applications, data exchange configuration information in the form of XML configuration information 116 that indicates a relationship between data object classes and XML elements.

The XML configuration information 116 is inserted into the comment statement associated with a definition statement for a class of data objects, including the attributes of the class. In the illustrated embodiment, the XML configuration information 116 includes a tag 118 that identifies the XML configuration information 116 within the comment statement. In the illustrated embodiment, the tag 118 is a tag defined by a user for the JavaDoc process 120. In other embodiments, any tag may be used.

For example, Table 2 shows statements in a modified JAVA source code file called Employee.java. The comment statement, an example of comment statement 114, originally in lines 2 through 4 is modified by inserting line 3.5 that includes XML configuration information, an example of XML configuration information 116. The XML configuration information 116 includes the user-defined JavaDoc tag "@xml-root-element" that is an example of tag 118, and the property "dtdFile." The property is set to a value "employee.dtd" given between the quotation marks in line 3.5.

TABLE 2

Statements in an Example Modified JAVA Source Code File

| Line Number | JAVA Statement |
|---|---|
| 1 | . . . |
| 2 | /** |

TABLE 2-continued

Statements in an Example Modified JAVA Source Code File

| Line Number | JAVA Statement |
|---|---|
| 3 | * This class represents employees of the company running the application |
| 3.5 | * @xml-root-element "Employee" dtdFile = "employee.dtd" |
| 4 | */ |
| 5 | public class Employee { |
| 6 | /** |
| 7 | * empname is the last name of the employee |
| 7.5 | * @xml-element "LastName" |
| 8 | */ |
| 9 | public String empname |
| 10 | /** |
| 11 | * empid is the identification number of the employee |
| 11.5 | * @xml-attribute "empid" required element = "Employee" |
| 12 | */ |
| 13 | public int empid |
| 14 | . . . |
| 15 | } |

The tag, @xml-root-element, indicates that the neighboring JAVA statement that defines a class is to serve as a root element for the XML documents that are used to exchange data with the application. A root element serves as the top of a hierarchy of elements that appear in an XML document. The property indicates that the root element is to be placed in its own grammar file, which may contain other elements, and the root element is identified as such in the grammar file; and the value for the property gives a name for the DTD file. In this example, the neighboring JAVA statement is the statement in line 5 defining the class Employee. Thus the XML configuration information 116 in comment 114 in the example of lines 3 through 4 indicates that the public class Employee is to be mapped to the root element "Employee" in the XML grammar defined in employee.dtd.

The comment statement originally in lines 6 through 8 is modified to insert line 7.5 of XML configuration information. The XML configuration information includes the tag "@xml-element" and the value "LastName" given between the quotation marks in line 7.5. This tag indicates that the neighboring JAVA statement that defines the attribute of class Employee is to serve as an element for the XML documents that are used to exchange data with the application. The value gives a name for the XML element that is more descriptive than the variable name. In this example, the neighboring JAVA statement is the statement in line 9 defining the class attribute, empname, as a public variable containing a string of characters. Thus the configuration information 116 in comment 114 in the example of lines 6 through 8 indicates that the public variable empname is to be mapped to an XML element called LastName, which is a sub-element of the root element Employee. This information is to be included in the DTD file named employee.dtd.

The comment statement originally in lines 10 through 12 is modified to insert line 11.5 of XML configuration information. The XML configuration information includes the tag "@xml-attribute" and the properties "required" and "element." The designation "element" refers to the element that this attribute is attached to; "required" indicates that this attribute must be present in any XML element of this type. The element property is set to a value "Employee" given between the quotation marks in line 3.5. This tag indicates that the neighboring JAVA statement that defines a class of data objects (in this case an attribute of the class) is to serve as an attribute of the element Employee for the XML documents that are used to exchange data with the application. The attribute's default property is required, which means that a value must be provided for the attribute whenever the element Employee is included in an XML document.

The property element is optional in the illustrated embodiment, but if the element property is not specified, then, in this embodiment, all data-members are assumed to be attributes of the root element. Since no value is given for the name of the attribute, the attribute is given the same name as the class or variable in the neighboring JAVA statement. In this example, the neighboring JAVA statement is the statement in line 13 defining the variable, empid, as a public variable containing an integer. Thus the XML configuration information 116 in comment 114 in the example of lines 10 through 12 indicates that the public variable empid is to be used as an XML attribute, by the same name, of the XML element Employee. This information is to be included in the DTD file named employee.dtd.

According to the illustrated embodiment, a user-defined doclet 124 is included in the JavaDoc process 120. The user-defined doclet 124 includes methods to be invoked for one or more JavaDoc tags, including one or more user-defined tags. In other embodiments, additional doclets are included in JavaDoc process 120. One or more methods of the user-defined doclet 124 produces statements 130 for an XML DTD or Schema document based on the XML configuration data 116 in the comment statement 114 for a data object in the modified source code file 112 and on the neighboring JAVA class definition statement. For example, the doclet 124 generates the XML DTD statements in Table 3.

TABLE 3

Statements in an Example XML DTD File

| Line Number | DTD Statement |
|---|---|
| 1 | <!ELEMENT Employee (LastName)> |
| 2 | <!ATTLIST Employee empid CDATA #REQUIRED> |
| 3 | <!ELEMENT LastName CDATA> |

The XML DTD statement in line 1 of Table 3 indicates that the root element, the first element in the DTD file, is called Employee and that the Employee element must include the sub-element LastName only once. The statement in line 2 indicates that the attributes of the element Employee include empid. CDATA indicates that the contents of the attribute are any character data. #REQUIRED indicates that the attribute must always be included when the Employee element is used. The statement in line 3 indicates that the element LastName does not include any other elements and that the LastName element may be filled by character data.

An application developer is able to control the formation of the DTD file from the JAVA class. The conventional system might make both empname and empid the same type of XML components since both are attributes of the class that are not themselves made up of sub-classes. Since both are single-valued, simple variables, the conventional system is likely to make both attributes of the element Employee. The resulting DTD is contrary to the desire of the developer to make the empname variable a separate XML element. Furthermore, the conventional system would not allow the elements to be re-named, as empname is here renamed LastName to be more descriptive.

Each XML element becomes an opening tag and a closing tag in an XML document. An opening tag includes angled brackets, <>, around the element name; and a closing tag includes angle brackets around the element name with a slash preceding the name. Thus the XML element's name, LastName, is used as an opening tag <LastName> and a closing tag </LastName>. Between the opening tag and the closing tag, the element contains the information type indicated; for example, the element contains the character data indicating the last name of the employee inserted between the tags <LastName> and </LastName>. Attributes, if any, are included in the opening tag. An example XML document with statements using the elements defined in the DTD file are given in Table 4 for two employees, John Smith and Jane Doe having employee identification numbers of 73645112 and 1, respectively.

TABLE 4

Example XML Document Using Elements Defined in DTD File

| Line Number | XML Statement |
|---|---|
| 1 | <!DOCTYPE Employee SYSTEM "employee.dtd"> |
| 2 | <Employee empid = "73645112"> |
| 3 | <LastName>Smith </LastName> |
| 4 | </Employee> |
| 5 | <Employee empid ="1"> |
| 6 | <LastName> Doe </LastName> |
| 7 | </Employee> |

The statement in line 1 is the document type declaration that tells an XML processor what DTD file, if any, defines the elements and attributes used by the current XML document. <!DOCTYPE . . . > indicates the statement is the document type declaration statement. The root element of the document type, Employee, is the first item in the statement. SYSTEM indicates the next value, "employee.dtd," is where the XML configuration information resides.

The statement in line 2 is an opening tag for the Employee element. It includes the Employee element's required attribute, empid. The attribute empid has a value of 73645112. The required single instance of the LastName element appears in line 3 as the opening and closing tags <LastName> and <LastName>, respectively, and the interspersed data. Between the opening and closing tags is the LastName data, Smith. The statement in line 4 is the closing tag for the Employee element.

Similarly, the statement in line 5 is an opening tag for another Employee element. It includes the Employee element's required attribute, empid. The attribute empid has a value of 1. The one instance of the LastName element appears in line 6 as the opening and closing tags <LastName> and </LastName>, respectively. Between the opening and closing tags is the LastName data, Doe. The statement in line 7 is the closing tag for the Employee element.

The example XML document in Table 4 is used to exchange data between the application having the source code in Table 1 (and Table 2) and other applications. For example, the XML document in Table 4 serves as input to the application.

Using the JavaDoc tool, JavaDoc tags are automatically detected in the source code and the information associated with the tag is automatically passed to the doclet. Therefore preparing a doclet that generates the XML DTD, or any exchange format configuration file, is a simpler task than programming a separate process to parse through the source code and find the configuration information 116. In some embodiments, however, a separate process, which is not a doclet of the JavaDoc process, does the parsing, finds the configuration information 116 in the comment statement 114, and produces the XML DTD statements 130 based on the configuration information 116 and the neighboring JAVA class definitions.

In some embodiments, the doclet or the separate process also produces JAVA modules for marshaling and de-marshalling data between the JAVA application module and XML documents. For example, in the illustrated embodiment the user-defined doclet 124 generates the JAVA modules 190 that marshal and de-marshal data between the application and XML documents.

Figure 1B:
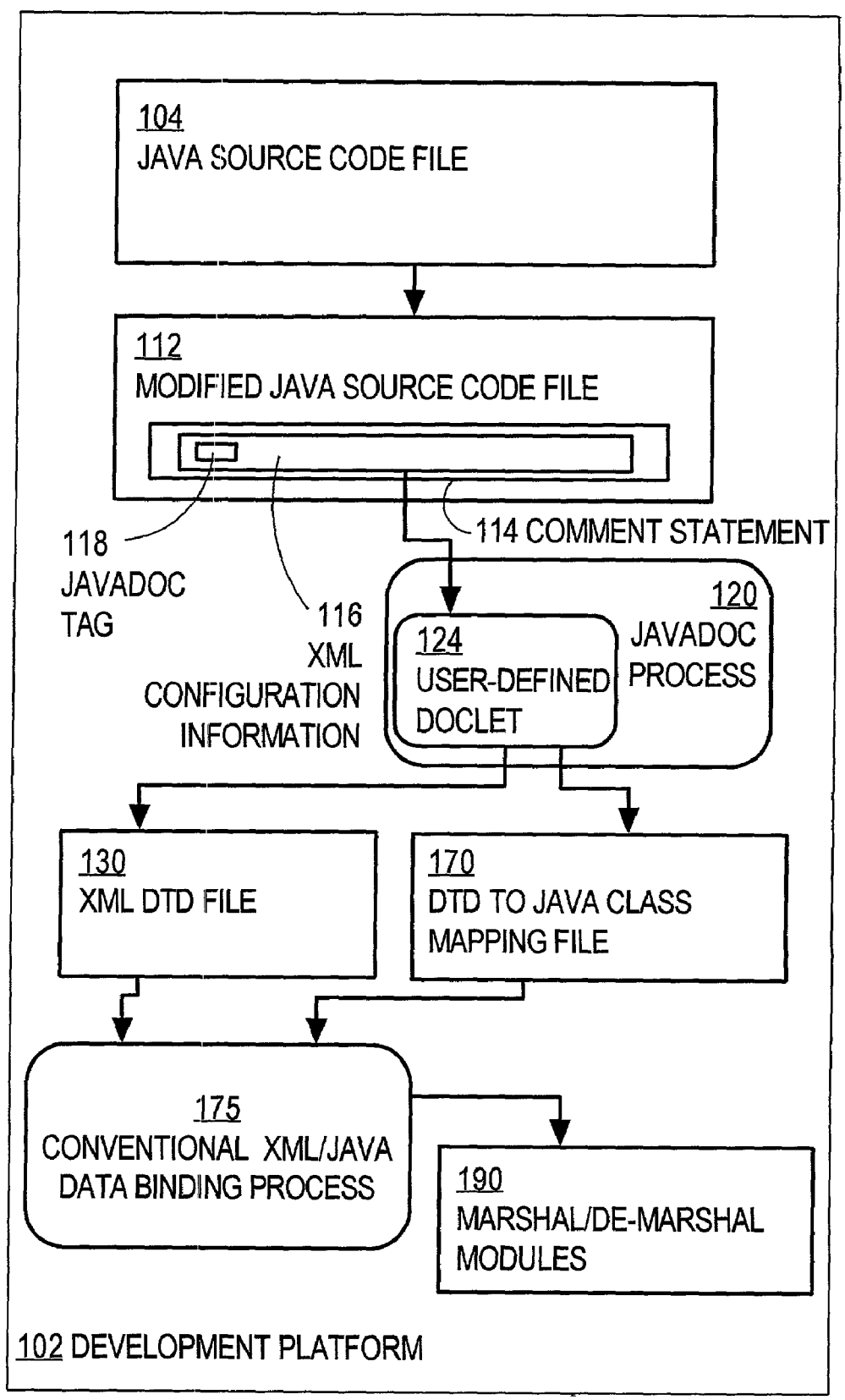
FIG. 1B is a block diagram that illustrates files and processes on a development platform that perform XML/JAVA Data Binding, according to another embodiment.

In other embodiments, one of the conventional approaches is used to generate the JAVA modules 190 based on the XML DTD 130. In some of these embodiments, the conventional approach used employs not only the DTD file but also a mapping file that maps DTD elements/attributes to JAVA class attributes. In such embodiments the doclet 124, or separate process, generates not only the DTD document, but also generates the mapping file. FIG. 1B is a block diagram that illustrates files and processes on a development platform that perform XML/JAVA Data Binding according to such an embodiment. In the illustrated embodiment, the JAVA source code file 104 and the modified JAVA source code file 112 are the same as in the embodiment depicted in FIG. 1A. However, in the embodiment of FIG. 1B, the doclet 124 produces both the XML DTD file 130 and the mapping file 170 that maps DTD elements/attributes to JAVA class attributes for use by a conventional process 175. The conventional process 175 for XML/JAVA Data Binding is then executed to produce the JAVA modules 190 for marshaling and de-marshaling data between the application and XML documents.

Table 5 shows statements in an example JAVA module for de-marshaling data from an XML document, such as the XML document listed in Table 4.

TABLE 5

Example JAVA Statements in De-marshaling Module

| Line Number | JAVA Statement |
|---|---|
| 1 | public class EmployeeXMLHelper{ |
| 2 | public Employee fromXML(InputStream in){ |
| 3 | ... |
| 4 | public void to XML(Employee employee, OutputStream out){ |
| 5 | ... |
| 6 | |

The statement in line 1 indicates that a class named EmployeeXMLHelper will be generated to provide marshaling and De-marshaling services. The three dots on lines 3 and 5 represent JAVA code that is not relevant to this example. The statement on line 2 defines a routine that, given an input source for the retrieval of XML de-marshals this data into an Employee object. The statement on line 4 defines a routine that receives an Employee object, marshals it to the XML format and writes this XML data to an output destination.

Figure 1C:
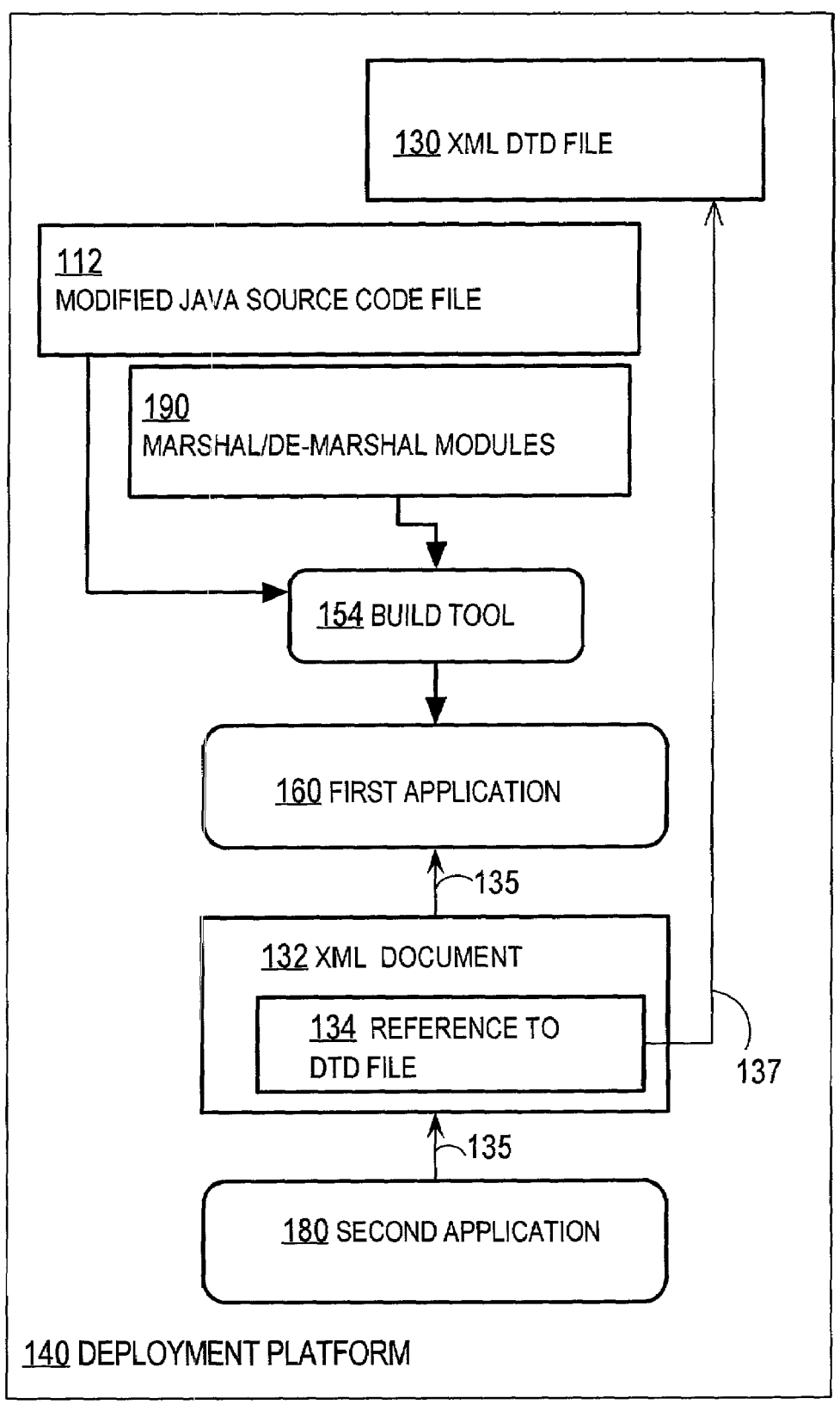
FIG. 1C is a block diagram that illustrates XML/JAVA Data Binding on a deployment platform, according to an embodiment.

FIG. 1C is a block diagram that illustrates XML/JAVA Data Binding on a deployment platform 140, according to an embodiment. Although the files and processes are depicted on a single platform in FIG. 1C, in other embodiments one or more of the files and processes may reside on other platforms connected to the platform 140 by a computer network.

The XML DTD filed 130 is available on the platform 140, as are the modified JAVA source code file 112 and the JAVA modules 190 that marshal and de-marshal data. A build tool 154 is a process that collects the modules for an application and generates machine instructions and data (executable code) of the application for execution by a computer processor. The first application 160 is the executable code that provides the behavior for the application. For example, the first application 160 is JAVA bytecode executed by a JAVA virtual machine for the application that determines whether to offer an employee a retirement package.

The executable code of the first application 160 is illustrated as a process. When the first application 160 is executing on the deployment platform 140, it exchanges data with other applications, such as second application 180, using one or more XML documents. Execution-time data exchange is indicated in FIG. 1C by arrows 135. For example, second application 180 produces XML document 132 based on the XML DTD file 130. The document 132 includes a reference 134 to the DTD file 130. A reference is indicated in FIG. 1C by arrow 137. The first application accepts the data in XML document 132 by invoking the de-marshaling process. For example, the first application 160 de-marshals the XML document having the statements listed in Table 4. The "employee.dtd" value for the SYSTEM attribute in line 1 is an example of the reference 134 to the XML DTD file 130.

Functional Description

Figure 2:
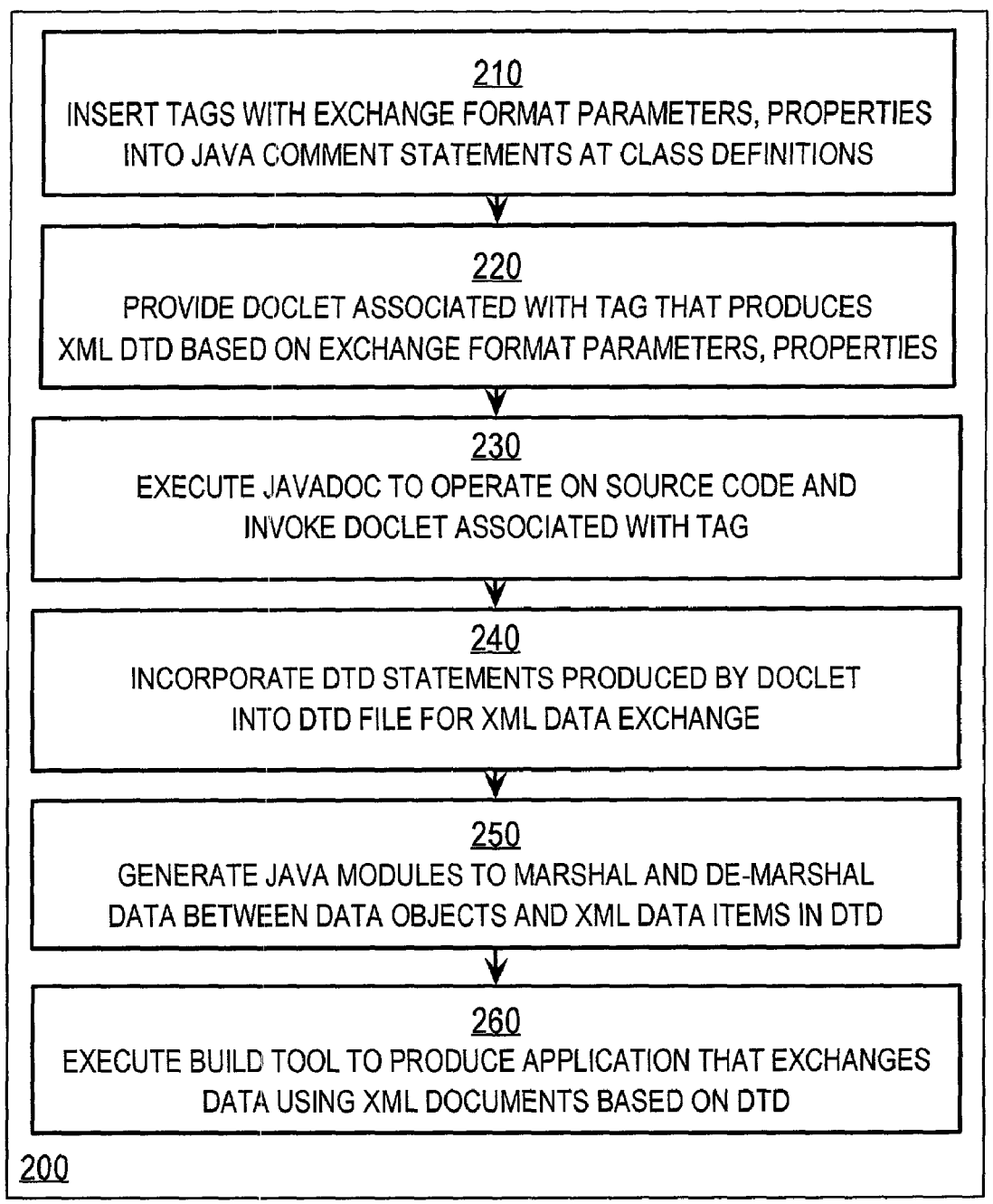
FIG. 2 is a flow chart that illustrates at a high level a method for performing XML/JAVA Data Binding, according to an embodiment.
Figure 3:
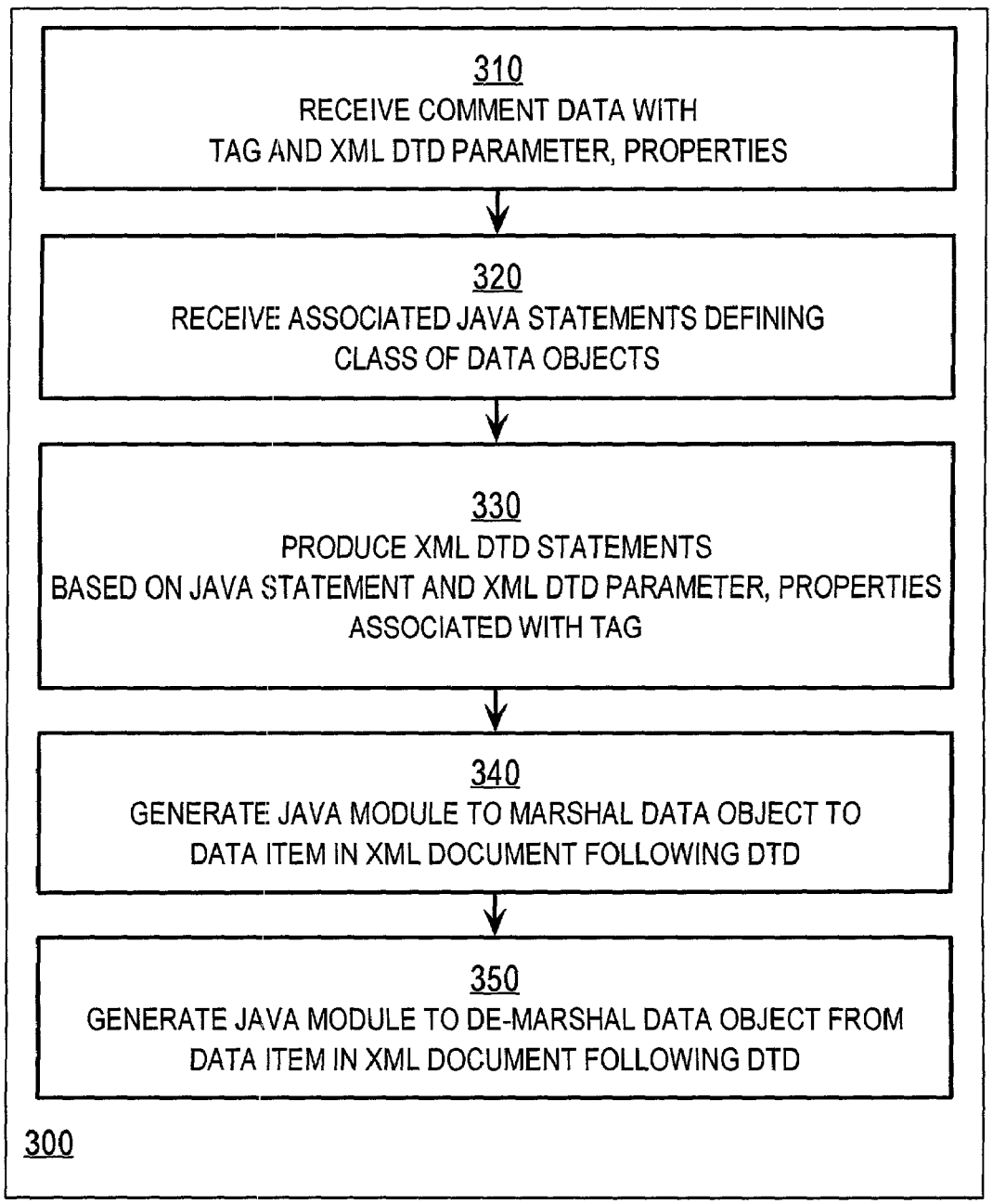
FIG. 3 is a flow chart that illustrates a method for a JAVA documentation system doclet process that performs XML/JAVA Data Binding, according to an embodiment.

FIG. 2 is a flowchart that illustrates one embodiment of a method 200 for binding an application with an open exchange format. Although steps are illustrated in FIG. 2 and FIG. 3 in a particular order, the steps may be reordered or occur at overlapping times in other embodiments. The steps of the flowchart in FIG. 2 are illustrated with reference to the example source file in Table 1, described above.

In step 210, an application developer inserts tags with configuration information for the exchange format, including exchange format parameters and properties, if any, into comment statements associated with data object class definitions (including simple variable definitions of class attributes). For example, the developer inserts statements in lines 3.5, 7.5, 11.5 of Table 2. The tag includes a symbol, like "@", which indicates the statement should be processed and an exchange format parameter such as "xml-root-element."

The parameter may have properties associated with it in the exchange format. For example, a root element may be associated with a property for a DTD file name. In such cases the property value is given and, in some cases, the property name is also given. For example, when the parameter indicates an XML attribute, the attribute's properties include the attribute's name, the type of default value, and the name of the element to which the attribute belongs. A value for the attribute's name and default type may be included without the property name, but the name of the element to which the attribute belongs is introduced by the property name "element" as in statement 11.5 to distinguish the element's name from the attribute's name.

In step 220, a process is provided that produces data for configuring the exchange format based on the information in the comment statement and associated class definition statement. For example, a doclet is provided for the JavaDoc tool. The doclet produces XML DTD based on the exchange format parameters and properties and the associated JAVA class definitions. The doclet performs the steps described in FIG. 3 in more detail below. In other embodiments, a process separate from the JavaDoc tool performs the steps described in FIG. 3. In some embodiments, the application developer writes the doclet or the separate process. In other embodiments, a second party writes the doclet or the separate process and the second party provides the doclet, or separate process, to a large number of application developers.

In step 230, the process is executed to operate on the modified source file. For example, JavaDoc is executed to operate on the modified source code file and to invoke the doclet associated with each tag encountered in the modified source code. In other embodiments the separate process is executed to operate on the modified source code file. For example, JavaDoc, or the separate process, is executed to operate on modified source code file 112, such as the source code in Table 2.

In step 240, the data produced is used to configure the exchange format. For example, the DTD statements produced by the doclet, or the separate process, are incorporated into a DTD file that describes the XML documents used for data exchange with the application. For example, the statements shown in Table 3 are inserted in the DTD file.

In step 250, program modules are generated to marshal and de-marshal data with the exchange format. For example, JAVA modules are generated to marshal and de-marshal data between XML documents and the application. In some embodiments the JAVA modules are generated by the doclet or the separate process written by the developer or provided by the second party. In other embodiments the JAVA modules are generated by one of the conventional methods based on the DTD file.

In some embodiments, the doclet, or the separate process, generates a mapping between JAVA class definitions and XML elements and attributes. In such embodiments, the conventional process uses the DTD file and the mapping to generate the JAVA modules. For example, conventional process 175 uses the DTD file 130 and the mapping 170 to generate the JAVA modules 190. An example mapping between JAVA class definitions and XML elements and attributes is shown in Table 6.

TABLE 6

Example Mapping Between JAVA Classes and DTD elements and attributes

| Line Number | JAVA Statement |
|---|---|
| 1 | <dtd-binding> |
| 2 |   <element name="Employee"> |
| 3 |     <class name="Employee"> |
| 4 |       <bind name="empid"> |
| 5 |         <attribute name="empid"/> |
| 6 |       </bind> |
| 7 |       <content> |
| 8 |         <bind name="LastName"> |
| 9 |           <element-ref name="LastName"/> |
| 10 |           <attribute name="empname"/> |
| 11 |         </bind> |
| 12 |       </content> |
| 13 |     </class> |
| 14 |   </element> |
| 15 |   |
| 16 |   <element name="LastName"> |
| 17 |     <content> |
| 18 |       </pcdata/> |
| 19 |     </content> |
| 20 |   </element> |
| 21 | </dtd-binding> |

In this example, Line 2 declares a binding rule for the XML element "Employee". Line 3 declares that the element will be bound to a class names "Employee" (defined in source file "Employee.java"). Lines 4–6 map the class attribute empid to the XML attribute empid. Line 7 marks the beginning of sub-element definitions. Lines 8–11 bind the XML sub-element LastName to the class attribute empname. Lines 12–14 close elements. Lines 16–20 define an XML element "LastName" with plain text content.

In step 260, executable code is generated for the application based on the source code and the modules for marshaling and de-marshaling data with the exchange format. For example executable code 160 is generated based on the source code file 112 and the JAVA modules 190 for marshaling and de-marshalling data between the JAVA classes and XML documents using the DTD file.

Subsequently, the executable code is executed and the application exchanges data with other applications using the exchange format configured in step 240. For example, the application 160 exchanges data using XML documents 132 based on, that is, configured by, the DTD file 130.

FIG. 3 is a flow chart that illustrates a method 300 for a process, such as a JavaDoc doclet, that performs XML/JAVA Data Binding, according to an embodiment.

In step 310, comment data is received that includes a tag with exchange format configuration information, such as an XML parameter and its properties. For example, the comment data in lines 10 through 12 of Table 2 is received with tag @xml-attribute for the XML attribute parameter and with value "required" for the default property and the value "Employee" for the property indicating the element to which the attribute belongs.

In step 320 the associated statement defining a class of data objects is received. For example, JAVA statements defining a class of data objects are received. As a more specific example, the JAVA statement in line 13 is received, which defines attribute empid of class Employee. In this embodiment, the first JAVA statement following the comment is associated with the comment. In other embodiments the JAVA statement preceding the comment is associated. In general, one or more statements neighboring the comment are associated with the configuration information in the comment.

In step 330, data for configuring the data exchange format is produced. For example the XML DTD statements in Table 3 are produced based on the XML parameter and properties and the associated JAVA statement. As a more specific example, line 2 in Table 3 is produced based on the JAVA attribute, empid, and the configuration information including tag, @xml-attribute, default property, required, and element property, Employee.

In step 340, a module is generated that marshals a data object of the class to one or more data items in the exchange format. For example, a JAVA module is generated that marshals a data object of a JAVA class into one or more items of the XML configured by the DTD. As a more specific example, a JAVA module is generated that exports an object of class Employee having attributes empname and empid into an XML element Employee having attribute empid and containing element LastName. Step 340 is optional and may be omitted if a conventional process is used to generate the module. In some embodiments, step 340 comprises producing a file used by the conventional process to generate the module. For example, a mapping file 170, such as listed in Table 6, is produced in step 340.

In step 350, a module is generated that de-marshals a data object of the class from one or more data items in the exchange format. For example, a JAVA module is generated that de-marshals a data object of a JAVA class from one or more data items of the XML configured by the DTD. As a more specific example, a JAVA module is generated that imports an object of class Employee having attributes empname and empid from an XML element Employee having attribute empid and containing element LastName. Step 350 is optional and may be omitted if a conventional process is used to generate the module.

The techniques described above automatically employ an open exchange format that is based on data structures internal to the source code and that is responsive to developer choices for options in employing the open exchange format. Furthermore these techniques automatically generate instructions to marshal and de-marshal data between the open exchange format employed and the internal data structures. In particular, these techniques automatically produce an XML DTD document that is based on JAVA data objects defined by a developer and that is responsive to developer choices for options in the XML DTD.

The techniques herein also are applicable to multiple nested JAVA classes. For example, there may be two classes as follows:

```
/**
 * @xml-root-element dtdFile="department.dtd"
 */
public class Department{
    /**
     * @xml-attribute required element="Department"
     */
    public String name;
    /**
     * @xml-element
     */
    public Employee[ ] employees;
}
/**
 * @xml-element "Employee"
 */
public class Employee{
    /**
     * @xml-element "LastName"
     */
    public String empname;
    /**
     * @xml-attribute required element="Employee"
     */
    public int empid;
}
```

Given instances of these classes where a Department was called "Accounting" and had two employees, "Flintstone" and "Rubble" the following XML would be produced:

<Department name="Accounting">
  <Employee empid="123">
    <LastName>Flintstone</LastName>
  </Employee>
  <Employee empid="456">
    <LastName>Rubble</LastName>
  </Employee>
</Department>

Hardware Overview

Figure 4:
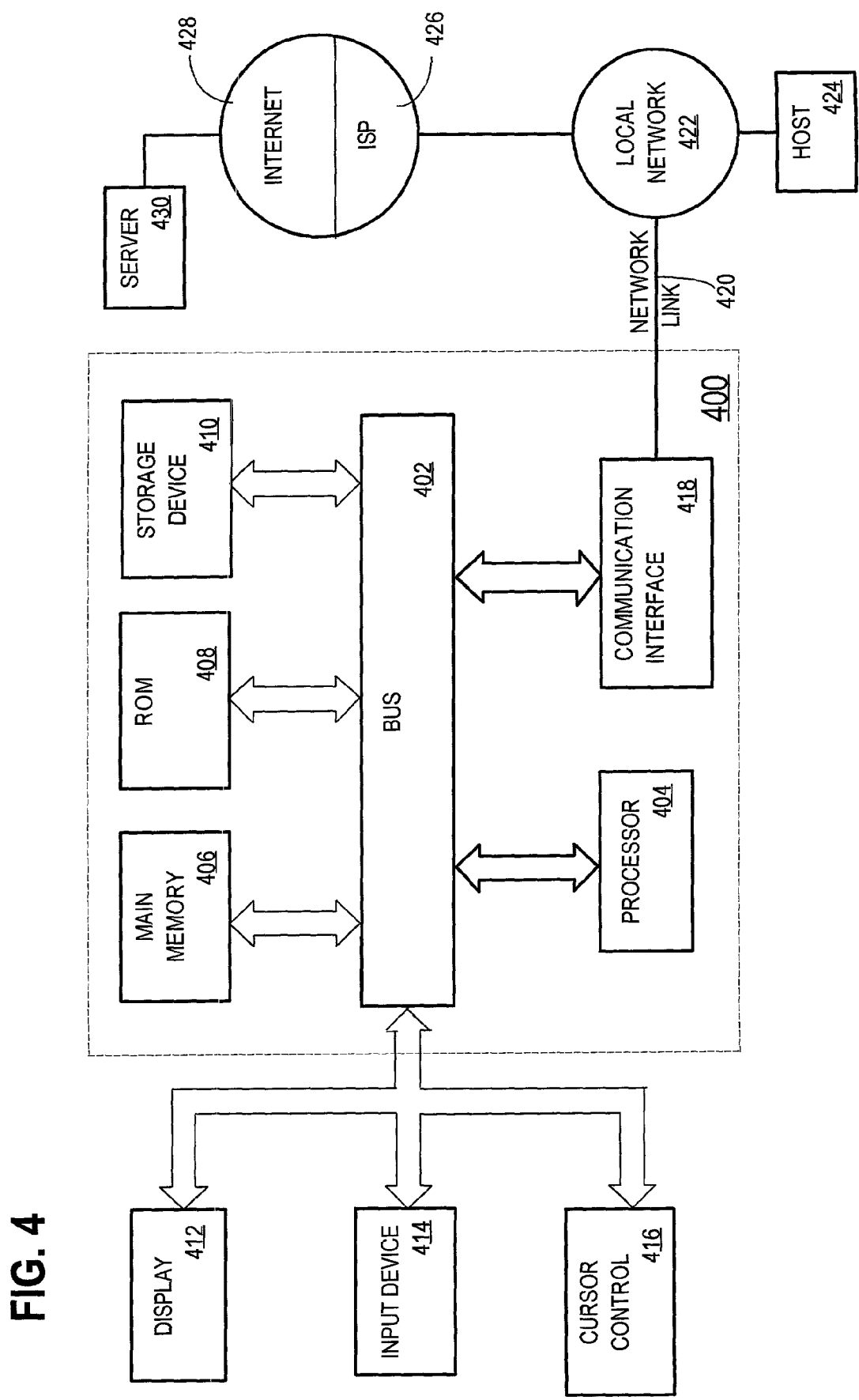
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for forming an application. According to one embodiment of the invention, an application is formed from source code files by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for a developer-defined doclet as described herein.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for automatically generating a description of a data exchange format based on computer program source code expressed in a source language, the method comprising the computer-implemented steps of:

receiving, from a source code file, comment data including first data indicating a parameter of the data exchange format, wherein the comment data is ignored by a source code processor of the source language;

receiving from the source code file second data, associated with the comment data, indicating a statement that defines a class of data objects in the source language;

wherein the data exchange format defines, using symbolic tags, a hierarchical structure of data that is exported from, and imported to, data objects of the class of data objects;

automatically generating, based on the first data and the second data, third data that describes the data exchange format, wherein the third data comprises instructions defining a mapping between attributes of the class of data objects and elements of the data exchange format; and generating a marshalling module to convert a data object of the class of data objects into a data item of the data exchange format as described by the third data.

2. A method as recited in claim 1, wherein generating the marshalling module is based on the first data and the second data.

3. A method as recited in claim 1, wherein generating the marshalling module is based on the third data.

4. A method as recited in claim 1, further comprising generating, based on the first data and the second data, a de-marshalling module to derive the data object of the class of data objects from the data item of the data exchange format as described by the third data.

5. A method as recited in claim 1, further comprising generating, based on the third data, a de-marshalling module to derive the data object of the class of data objects from the data item of the data exchange format as described by the third data.

6. A method as recited in claim 1, wherein the third data is formatted according to a database query language.

7. A method as recited in claim 1, wherein the third data is formatted according to a symbolic markup language.

8. A method as recited in claim 1, wherein the third data is formatted according to extensible markup language (XML).

9. A method as recited in claim 1, wherein the third data comprises one or more statements in an XML schema document.

10. A method as recited in claim 1, wherein the third data is one or more statements in an XML document type definition (DTD) document.

11. A method as recited in claim 1, wherein the third data is one or more statements in an XML document type definition (DTD) document, and wherein the parameter is at least one of a root element associated with an entire DTD document, an element and an attribute of an element.

12. A method as recited in claim 1, wherein the third data is one or more statements in an XML document type definition (DTD) document, and wherein the first data includes one or more properties of the parameter.

13. A method as recited in claim 1, wherein the source language is JAVA.

14. A method as recited in claim 1, wherein the source language is JAVA, and wherein the first data includes a tag for an automated JAVA documentation system.

15. A method as recited in claim 1, wherein the source language is JAVA, wherein the first data includes a tag for an automated JAVA documentation system, and wherein the tag is a user-defined tag for the JAVA documentation system.

16. A method as recited in claim 1, wherein the source language is JAVA, wherein the first data includes a tag for an automated JAVA documentation system, wherein the tag is a user-defined tag for the JAVA documentation system, and wherein said step of generating the third data is performed by a user-defined routine invoked by the automated JAVA documentation system in response to the tag.

17. A computer-readable medium storing one or more sequences of instructions for binding a data exchange format with an application having source code in a particular language, which instructions, when executed by one or more processors, cause the one or more processors to carry out the steps of:

receiving, from a particular file that includes the source code, comment data including first data indicating a parameter of the data exchange format, wherein the comment data is ignored by a source code processor of the particular language;

receiving from the particular file second data, associated with the comment data, indicating a statement that defines a class of data objects in the particular language;

wherein the data exchange format defines, using symbolic tags, a hierarchical structure of data that is exported from, and imported to, data objects of the class of data objects;

generating, based on the first data and second data, third data for configuring the data exchange format, wherein the third data comprises instructions defining a mapping between attributes of the class of data objects and elements of the data exchange format; and generating a marshalling module to convert a data object of the class of data objects into a data item of the data exchange format as described by the third data.

18. An apparatus for binding a data exchange format with an application having source code in a particular language, comprising:

means for receiving, from a particular file that includes the source code, comment data including first data indicating a parameter of the data exchange format, wherein the comment data is ignored by a source code processor of the particular language;

means for receiving from the particular file second data, associated with the comment data, indicating a statement that defines a class of data objects in the particular language;

wherein the data exchange format defines, using symbolic tags, a hierarchical structure of data that is exported from, and imported to, data objects of the class of data objects;

means for generating, based on the first data and second data, third data for configuring the data exchange format, wherein the third data comprises instructions defining a mapping between attributes of the class of data objects and elements of the data exchange format; and means for generating a marshalling module to convert a data object of the class of data objects into a data item of the data exchange format as described by the third data.

19. An apparatus for binding a data exchange format with an application having source code in a particular language, comprising:

a processor;

one or more stored sequences of instructions which, when executed by the processor, cause the processor to carry out the steps of:

receiving, from a particular file that includes the source code, comment data including first data indicating a parameter of a data exchange format, wherein the comment data is ignored by a source code processor of the particular language;

receiving from the particular file second data, associated with the comment data, indicating a statement that defines a class of data objects in the particular language;

wherein the data exchange format defines, using symbolic tags, a hierarchical structure of data that is exported from, and imported to, data objects of the class of data objects;

generating, based on the first data and second data, third data for configuring the data exchange format, wherein the third data comprises instructions defining a mapping between attributes of the class of data objects and elements of the data exchange format; and generating a marshalling module to convert a data object of the class of data objects into a data item of the data exchange format as described by the third data.

20. A method for automatically generating a description of a data exchange format based on a JAVA source code of an application, the method comprising the computer-implemented steps of:

receiving, from a JAVA source code file, comment data that comprises one or more tags of the data exchange format and one or more parameters that are associated with the one or more tags, wherein the comment data is ignored by a source code processor of the JAVA language;

receiving, from the JAVA source code file, one or more statements that define a class of data objects in the JAVA language, wherein the class of data objects is associated with the comment data;

wherein the data exchange format expresses, in eXtensible Markup Language (XML), the structure of data that is exported from, and imported to, data objects of the class of data objects;

based on the one or more tags, the one or more parameters, and the one or more statements, a JAVADOC documentation system generating an XML Document Type Definition (DTD) document that describes the data exchange format, wherein the XML DTD document comprises instructions defining a mapping between attributes of the class of data objects and elements of the data exchange format;

based on the one or more tags, the one or more parameters, and the one or more statements, generating a marshalling module for converting a data object of the class of data objects into a data item of the data exchange format as described by the XML DTD document; and building an executable version of the application based at least on the JAVA source code and the marshalling module.

21. A method as recited in claim 20, wherein:

the one or more tags are user-defined JAVADOC tags; and each of the one or more parameters is any one of a root XML element associated with the entire XML DTD document, an XML element of the data exchange formal, and an attribute of an XML element of the data exchange format.

22. A method as recited in claim 20, further comprising:

based on the one or more tags, the one or more parameters, and the one or more statements, generating a de-marshalling module for deriving the data object of the class of data objects from the data item of the data exchange format as described by the XML DTD document;

wherein building the executable version of the application is further based on the de-marshalling module.

* * * * *